(12) United States Patent
Hall

(10) Patent No.: US 6,970,254 B2
(45) Date of Patent: Nov. 29, 2005

(54) ROBOTIC VISION SYSTEM TO LOCATE Z-FORMS

(75) Inventor: Terence F. W. Hall, Santa Monica, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 484 days.

(21) Appl. No.: 10/241,334

(22) Filed: Sep. 11, 2002

(65) Prior Publication Data

US 2004/0046967 A1    Mar. 11, 2004

(51) Int. Cl.⁷ .......................................... G01B 11/14
(52) U.S. Cl. .................. 356/614; 250/559.29; 29/798
(58) Field of Search ............................... 356/614, 622, 356/623; 250/559.29, 559.31, 559.36; 29/798, 29/432

(56) References Cited

U.S. PATENT DOCUMENTS

| | | | |
|---|---|---|---|
| 4,620,656 A | 11/1986 | McClay et al. | |
| 4,666,303 A * | 5/1987 | Pryor | ......................... 356/606 |
| 4,936,497 A | 6/1990 | Ordelt | |
| 5,515,599 A | 5/1996 | Best | |
| 5,832,594 A | 11/1998 | Avila | |
| 5,859,440 A * | 1/1999 | Acquaviva | .............. 250/559.36 |
| 5,910,894 A | 6/1999 | Pryor | |
| 5,919,413 A | 7/1999 | Avila | |
| 5,956,150 A | 9/1999 | Kanne | |
| 6,603,563 B1 * | 8/2003 | Gagliano | ..................... 356/601 |
| 6,611,345 B1 * | 8/2003 | Luxem | ........................ 356/614 |

* cited by examiner

Primary Examiner—Hoa Q. Pham
(74) Attorney, Agent, or Firm—Stetina Brunda Garred & Brucker

(57) ABSTRACT

A Z-form position detector useful for ascertaining the position of Z-forms with respect to underlying composite structure. The device comprises an oscillating laser that generates a line projected onto the Z-form and composite structure at an angle. The line appears discontinuous due to the topography of the Z-form and composite structure. For example, the line is discontinuous at the edges of the Z-form. The device further comprises a sensor sensitive to the frequency of the laser. The sensor scans along the line until a discontinuity (i.e., a break in the line) is detected. Since the discontinuity corresponds to the edge of the Z-form, detection of the discontinuity allows the device to ascertain precise coordinates of a point on the edge of the Z-form. The device thus allows Z-pins to be driven into composite structure automatically for savings on time and cost.

19 Claims, 4 Drawing Sheets

ROBOTIC VISION SYSTEM TO LOCATE Z-FORMS

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The following generally relates to positioning systems, and more specifically relates to optical systems used to automatically locate Z-forms with precision for reinforcement of composite structures.

Manufacturers utilize composite materials in a wide variety of applications. The relatively high strength-to-weight ratio, stiffness-to-weight ratio, and fatigue characteristics of composites have made the material increasingly popular with aerospace, automotive, and other industries.

To join individual composite parts, manufacturers often use conventional fasteners; however, the use of conventional fasteners typically requires access to both sides of the assembly, and such access can be limited. In these cases, manufacturers usually employ alternative attachment means. For example, the composite parts can be adhesively joined or co-bonded, but these methods often result in an inadequate bond. For a more secure bond, manufacturers insert reinforcing pins, commonly called "Z-pins," through the parts normal to the bondline. As such, the Z-pins bear a portion of the loading that might otherwise damage the bondline.

Manufacturers typically insert Z-pins with largely non-automated processes. For example, multiple Z-pins held within a foam carrier (collectively referred to as a "Z-form") are manually positioned on a target area of the composite part. Then, an insertion tool is manually located over the Z-form, after which the inserting tool utilizes ultrasonic energy to force the Z-pins out of the Z-form and into the target area of the composite. However, manufacturers desire a more automated process so that the Z-pinning process can be employed in high yield production faster and cheaper.

U.S. Pat. No. 5,832,594 to Avila and U.S. Pat. No. 5,919,413 to Avila both disclose a hydraulic Z-pin insertion tool and a method of using the same. As described in these patents, Z-forms are loaded into the tool, which is then positioned over an area of composite to be pinned, and an actuator within the tool drives the pins into the composite. Thus, the tool and insertion method disclosed in the Avila patents allow Z-pins to be inserted automatically, and production costs are partially reduced as result. However, portions of the Z-form can become jammed within the tool as the insertion process takes place. Once jammed, manual labor is required to clear the jam, thereby increasing manufacturing time. As a result, the cost savings resulting from the automated process are less significant or, in some cases, eliminated.

Thus, there remains a need among composite manufacturers for an improved automated Z-pinning process. Ideally, the automated process would involve pre-positioning the Z-form on the composite target area, separate from the insertion tool, because there is less chance for the insertion tool to become jammed. In order to achieve proper pinning in this manner, the insertion tool should be located according to the position of the Z-form with a high degree of precision (e.g., approximately +/– 0.025 inches). However, manual positioning of the composites, tool, and Z-form typically results in a cumulative error of approximately +/–0.25 inches.

Therefore, it is understood that there is an ongoing need for an apparatus that enables a Z-pin insertion tool to be located with precision relative to a Z-form. Such a tool and its method of use would allow for a more efficient automated manufacturing process and advantageously reduce manufacturing time and costs.

BRIEF SUMMARY OF THE INVENTION

In response to the aforementioned needs, there is disclosed a Z-form position detector, comprising a light-emitter capable of projecting a light beam onto a Z-form that is positioned adjacent to a composite structure. From a viewpoint looking at the composite structure, the light beam has at least one discontinuity that corresponds with an edge of the Z-form.

The Z-form position detector further comprises a sensor positioned adjacent to the Z-form. The sensor is capable of detecting the at least one discontinuity and is further capable of correlating the detection of the at least one discontinuity to the approximate position of a point on the edge of the Z-form.

Also disclosed is a method of detecting a position of a Z-form before insertion of Z-pins into a composite structure. First the method comprises positioning the Z-form over the composite structure. Then, a laser line is projected over the Z-form, wherein the laser line forms at least one discontinuity corresponding to an edge of the Z-form. Next, a sensor is positioned adjacent to the laser line, and the sensor is capable of detecting the at least one discontinuity and translating the detection into positional information pertaining to one point on the edge of the Z-form. Subsequently, the laser line is projected over the Z-form at a different location such that at least one discontinuity is formed corresponding to an edge of the Z-form. Then, the sensor detects the at least one discontinuity and translates the detection into positional information pertaining to another point on the edge of the Z-form. Finally, the two points of positional information are extrapolated into positional information pertaining to the entire edge of the Z-form.

Both the Z-form location detector and the method of using the same allow the precise locations of Z-forms to be ascertained automatically. Obtaining these precise positional coordinates is advantageously quicker than manually determining the precise location of the Z-forms. Also, the present invention allows for automatic insertion of reinforcing Z-pins into composite structures. Thus, the automation described herein saves time and money in the manufacturing of composite structures.

BRIEF DESCRIPTION OF THE DRAWINGS

These as well as other features of the present invention will become more apparent upon reference to the drawings wherein.

DETAILED DESCRIPTION OF THE INVENTION

Figure 1:
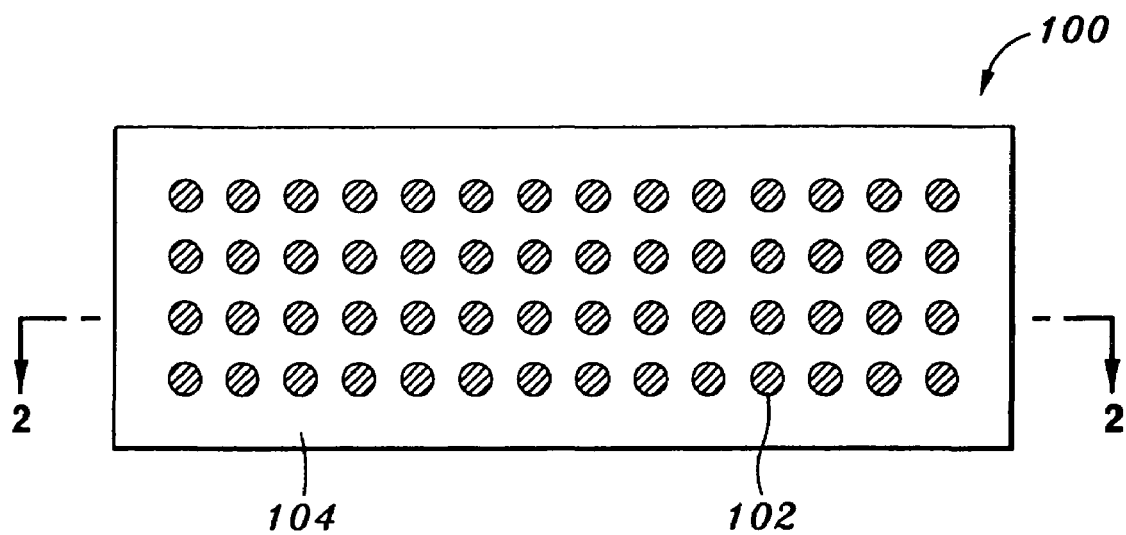
FIG. 1 is a plan view of a Z-form.
Figure 2:
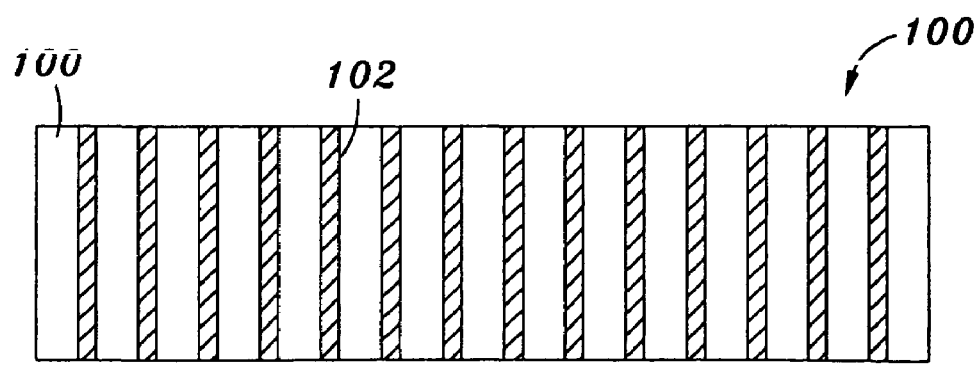
FIG. 2 is a cross sectional view of the Z-form illustrated in FIG. 1.

Referring now to the drawings wherein the showings are for purposes of illustrating preferred embodiments of the present invention only, and not for purposes of limiting the same, FIG. 1 and FIG. 2 illustrate one embodiment of a Z-form 100. As shown, the Z-form 100 comprises a plurality of Z-pins 102 embedded within a carrier 104. In one embodiment, the typical Z-pin 102 has a diameter of 0.011 inches and a length of 0.5 inches and is made out of a rigid material such as stainless steel, titanium, copper, graphite, epoxy, composite, glass, carbon, or the like. Typically, the manufacturer embeds an array of Z-pins 102 within the carrier 104, which is often made of a foam-like material, for shipping purposes. In one embodiment, the manufacturer embeds the Z-pins 102 at a density of 400 per square inch. As will be described in greater detail below, the Z-form 100 is positioned on an uncured composite structure, and an insertion tool moves the Z-pins 102 out of the carrier 104 and into the composite structure to reinforce the same.

Figure 3A:
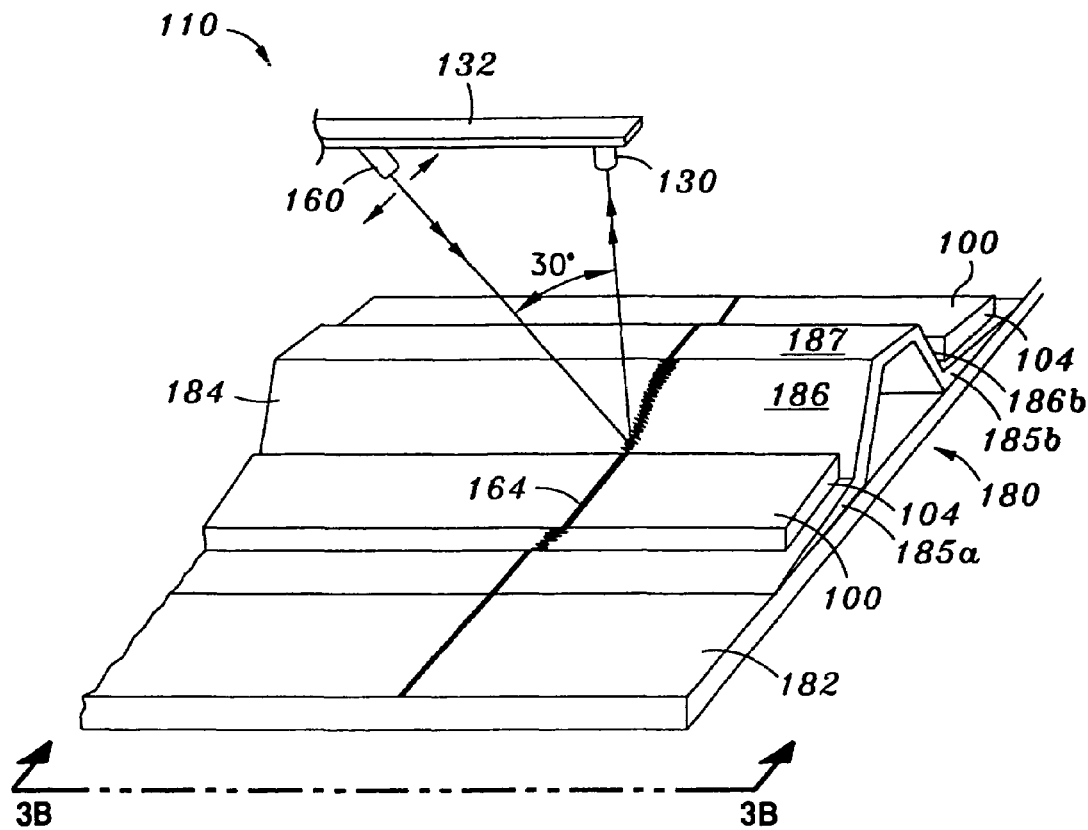
FIG. 3A is a perspective view of one embodiment of a Z-form position detector.
Figure 3B:
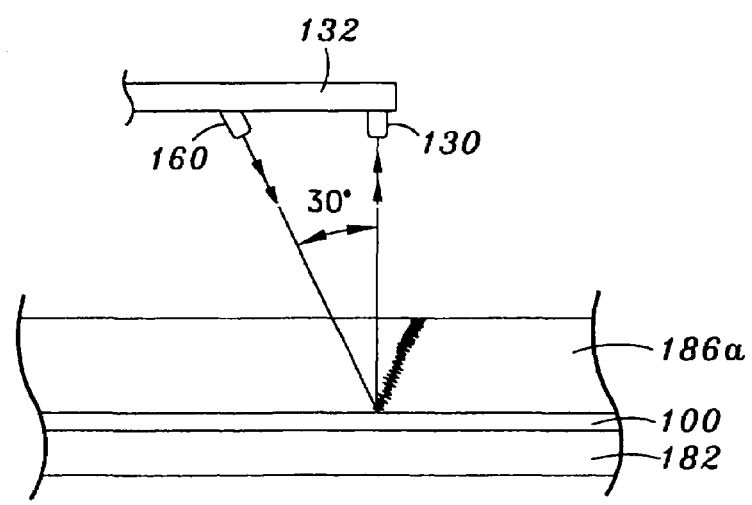
FIG. 3B is a side view of the Z-form position detector taken from FIG. 3A.

Turning now to FIGS. 3A and 3B, one embodiment of a Z-form position detector 110 is illustrated. The position detector 110 is situated adjacent to a composite structure 180. In the embodiment shown, the composite structure 180 comprises a laminate skin 182. As is widely known in the art, the laminate skin 182 comprises a plurality of layers of composite material adhered together.

Also, the composite structure 180 comprises a hat stiffener 184 positioned atop the laminate skin 182. Like the laminate skin 182, the hat stiffener 184 is made out of composite material. As shown in FIGS. 3A and 3B, the hat stiffener 184 includes three portions: a pair of flanges 185a, 185b that largely lie flush with and are adhered to the laminate skin 182; a pair of trusses 186a, 186b that extend outward away from the laminate skin 182; and a top portion 187, positioned parallel to the laminate skin 182 and extending between the trusses 186a, 186b.

As is widely known in the art, when the flanges 185a, 185b are attached to the laminate skin 182, the orientation of the trusses 186a, 186b largely inhibits the laminate skin 182 from bending. Advantageously, the hat stiffener 184 increases the stiffness of the laminate skin 182, thereby broadening the variety of possible applications for the composite structure 180.

It is noted that the composite structure 180 illustrated in FIGS. 3A and 3B is used only for illustration. Thus, the Z-form position detector 110 could be used in conjunction with a variety of composite structures 180 without departing from the spirit of the invention.

In one embodiment, individual Z-forms 100 are positioned atop the flanges 185a, 185b so that each of the Z-pins 102 are oriented axially toward the hat stiffener 184 and laminate skin 182. As will be discussed in greater detail below, the Z-pins 102 are pushed out of the carrier 104 of the Z-form 100 and into the hat stiffener 184 and laminate skin 182 to reinforce the bond between the flanges 185a, 185b and the laminate skin 182. However, before this process can be completed, the Z-forms 100 must be located with precision.

Figure 4:
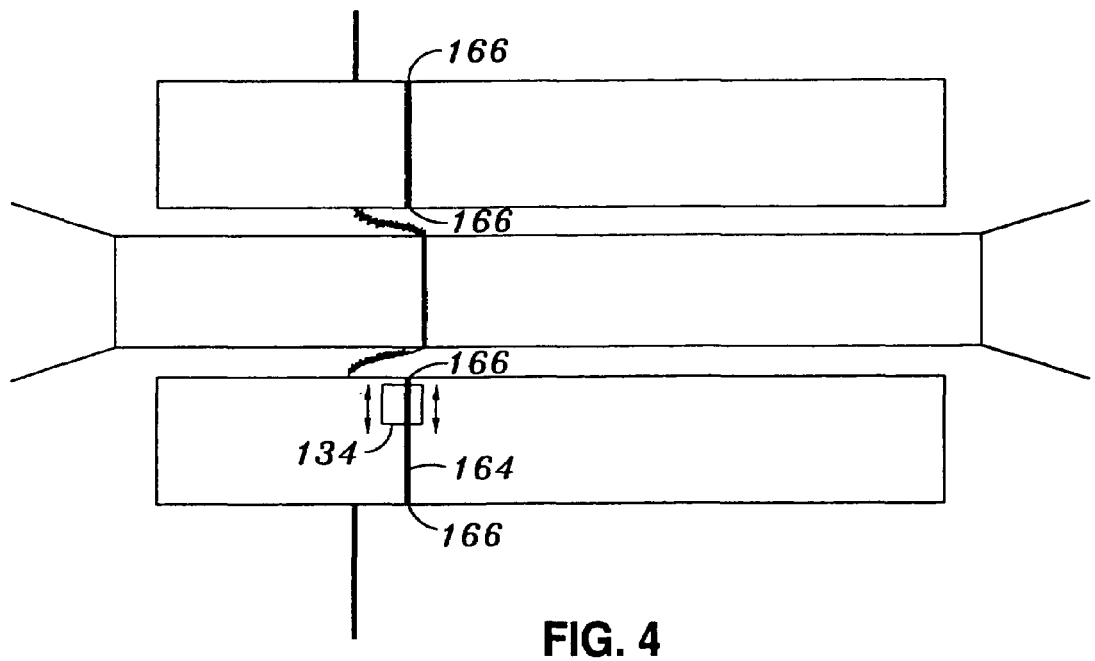
FIG. 4 is a top view of one embodiment of the Z-form position detector of FIG. 3.

As shown in FIGS. 3A and 3B, the Z-form position detector 110 comprises a laser unit 160. The laser unit 160 is widely known in the art for emitting a focused beam of light. In the embodiment shown, the laser unit 160 is aimed generally about 20° to about 40°, and preferably, 30° from normal to the surface of the laminate skin 182 and it oscillates in a direction generally parallel to the surface of the laminate skin 182 and at 90° to the longitudinal axis of the Z-form 100 and hat stiffener 184. As is shown in FIGS. 3A, 3B, and 4, the oscillations are preferably fast enough such that the laser unit 160 forms the appearance of a line 164 of light across the composite structure 180 and Z-forms 100.

As is shown, the line 164 is discontinuous because of the varied topography of the composite structure 180. Particularly, the line 164 forms a discontinuity 166 where the line 164 intersects the edges of the Z-forms 100. As will be discussed in greater detail, since the discontinuities 166 accurately correspond to the edges of the Z-form 100, the discontinuities 166 can be used to detect the position of the Z-forms 100 with precision.

Moreover, the Z-form position detector 100 comprises a sensor 130. In one embodiment, the sensor 130 is an analog or digital unit sensitive to the frequency of the light emitted from the laser unit 160, and it is also calibrated positionally with respect to other components of the Z-form position detector 110. The sensor 130 is suspended above and pointed normal to the surface of the laminate skin 182. Oriented as such, the sensor 130 scans the surface of the Z-form 100 and is able to detect frequency of the laser line 164 and any discontinuities 166 (i.e., changes in intensity caused by the transition from a continuous line to a broken or blurred line).

As shown, the sensor 130 and laser unit 160 are attached to an end effector 132. In one embodiment, the end effector 132 moves the sensor 130 and laser unit 160 in a direction generally parallel to the surface of the laminate skin 182.

In one embodiment, the sensor 130 scans only a predetermined area of the Z-form 100. This area is known as the sensor window 134 (shown in FIG. 4), and is as long and as wide as the width of the laser line 164 in one embodiment. As stated, both the laser unit 160 and sensor 130 are attached to the end effector 132, allowing alignment between the laser unit 160 and sensor 130. Thus, the sensor window 134 is centered over the line 164.

As will be described in more detail, the sensor 130 is able to scan the surface of the Z-form 100 falling within the sensor window 134. The sensor 130 scans along the laser line 164 and recognizes the frequency of that light. However, when the sensor 130 fails to detect the laser line (i.e., when a discontinuity 166 enters the sensor window 134), the sensor 130 takes note of the precise positional coordinates of the point where the laser line stopped being detected. These positional coordinates are then used to ascertain the position of the entire Z-form 100 for subsequent Z-pin 102 insertion.

It is understood that the components used in this embodiment of the Z-form position detector 110 are relatively inexpensive, reliable, and can easily be incorporated into a production environment. Thus, the Z-form position detector 110 does not significantly increase the costs of the automatic pinning process.

Figure 5:
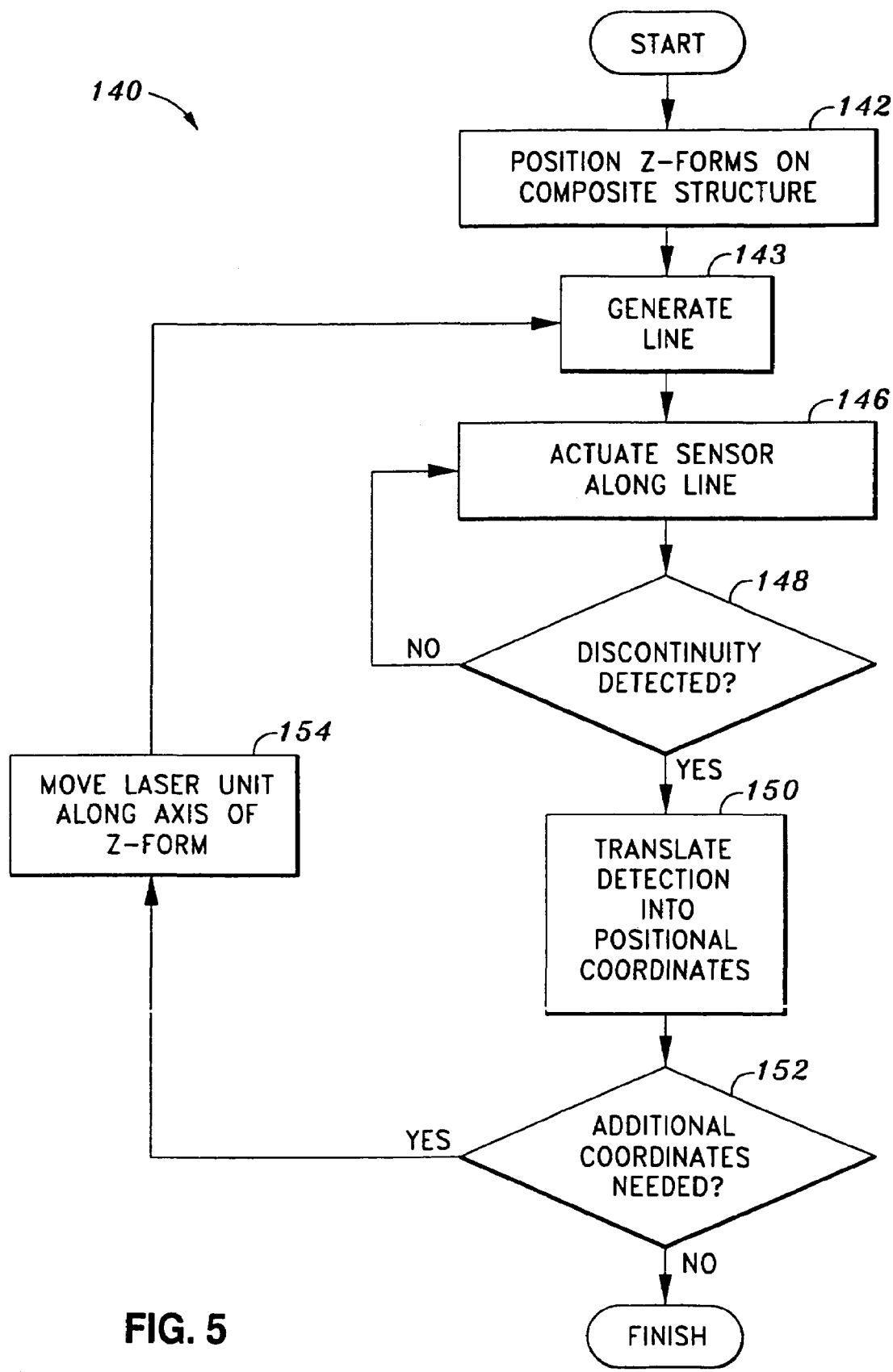
FIG. 5 is a flow chart illustrating a method of utilizing the Z-form position detector.

FIG. 5 illustrates one embodiment of a method 140 of utilizing the Z-form position detector 110 described herein above. Beginning with a first step 142, a user positions the Z-forms 100 over the composite structure 180. With respect to the embodiment shown in FIGS. 3A and 3B, performing the first step 142 involves positioning the Z-forms 100 on the flanges 185a, 185b of the hat stiffener 184 such that the Z-pins 102 are pointed axially toward the flanges 185a, 185b and the laminate skin 182 lying thereunder.

Next, in a second step 143, the oscillating laser unit 160 functions to form the line 164 on the composite structure 180. As described above, the line 164 includes discontinuities 166 due to the topography of the composite structure 180.

Furthermore, in a third step 146 of the method 140, the end effector 132 moves the sensor 130 approximately parallel to surface of the laminate skin 182, moving the sensor window 134 along the line 164. The method 140 continues into a first decision state 148, wherein it is asked whether a discontinuity 166 is detected within the sensor window 134. If the sensor 130 does not detect a discontinuity 166 (i.e., if the sensor 130 recognizes a continuous laser line within the sensor window 134), the fourth step 146 continues and the sensor 130 actuates along the line 164.

However, if the sensor 130 does detect a break in the laser line within the sensor window 134 (i.e., the sensor window 134 encompasses a discontinuity 166), then the first decision state 148 can be answered in the affirmative, giving way to a fourth step 150. In the fourth step 150, the sensor 130 sends a detection signal to external circuitry and logic (not shown), which translates the detection signal into precise positional coordinates of the point at which the laser line discontinuity occurs. Since the discontinuity 166 corresponds with the edge of the Z-form 100, these positional coordinates represent a point on the edge of the Z-form 100. In the preferred embodiment, the positional coordinates obtained by the sensor 130 are accurate within +/−0.05 inches, and more preferably, within +/−0.025 inches or better.

The method 140 then moves into a second decision state 152. If additional coordinates of the edge of the Z-form 100 are needed before the Z-pins 102 can be driven into the composite structure 180, then the method 140 moves into a fifth step 154. In the fifth step 154, the end effector 132 moves the laser unit 160 and sensor 130 along the axis of the Z-form 100. Then, the second step 143 is repeated so as to generate a new line 166 over a different section of the Z-form 100. The method 140 continues as detailed above and new coordinates are procured, until no new coordinates are needed. For example, it is understood that after two discontinuities 166 at different axial positions are detected, accurate positional coordinates for the entire edge of the Z-form 100 are known. However, it is also understood that the number of measurements can be increased for more overall accuracy. Therefore, in one embodiment, the method 140 is used to locate three discontinuities 166 at different axial positions of the Z-form 100 for a more accurate representation of the edge of the Z-form 100.

Upon completion of the method 140, the procured positional coordinates allow an insertion tool (not shown) to automatically move precisely above the Z-form 100 and drive the Z-pins 102 out of the carrier 104 and into the composite structure 180. The Z-pins 102 reinforce the attachment between the hat stiffener 184 and the laminate skin 182.

In one embodiment, the end effector 132 is attached to the insertion tool (not shown). As such, since the laser unit 160 and sensor 130 are located on the insertion tool, the insertion tool requires less movement, thereby reducing manufacturing time and cost.

Both the Z-form location detector 110 and the method 140 of using the same allow the precise locations of Z-forms to be ascertained automatically. Obtaining these precise positional coordinates is advantageously quicker than manually determining the precise location of the Z-forms. Also, the present invention allows for automatic insertion of reinforcing Z-pins into composite structures. Thus, the automation described herein advantageously saves time and money in the manufacturing of composite structures.

Figure 6:
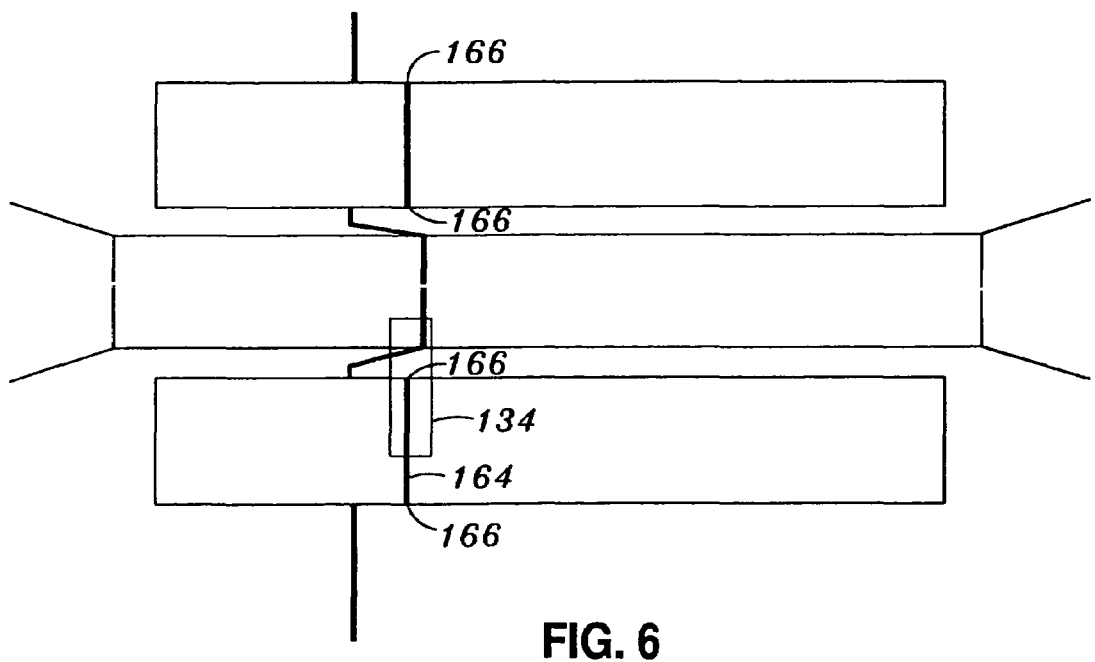
FIG. 6 is a top view of an alternative embodiment of the Z-form position detector of FIG. 3.

Turning now to FIG. 6, an alternative embodiment of the Z-form position detector 110 is illustrated. This embodiment is similar to the embodiment described above, except that the sensor 130 is capable of scanning more of the line 164 at one time. In other words, the sensor window 134 is relatively long and can encompass more of the portion of the line 164 falling on the Z-form 100. Preferably, its size allows the sensor window 134 to encompass a discontinuity 166 without having to physically move the sensor 130. For instance, a linear array sensor 130 is used in one embodiment so that the sensor 130 need not move. As such, this absence of actuation speeds up the process of detecting the discontinuities 166. Advantageously, since the sensor 130 is not actuated, manufacturing time and costs are advantageously reduced.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A method of detecting a position of a Z-form for aligning Z-pins to be inserted into a composite structure, comprising:
   a) positioning the Z-form over the composite structure;
   b) projecting a laser line onto the Z-form, the laser line forming at least one discontinuity corresponding to the position of the Z-form; and
   c) positioning a sensor adjacent to the laser line, wherein the sensor is capable of detecting the at least one discontinuity and translating the detection of the at least one discontinuity into positional information pertaining to the position of the Z-form.
   d) repeating steps (a) through (c) until enough positional information is obtained to allow the Z-pins to be inserted automatically.

2. The method of claim 1, wherein the sensor scans the Z-form over a select sensor window area on the composite structure, the sensor detecting the at least one discontinuity when the at least one discontinuity falls within the sensor window.

3. The method of claim 2, wherein the sensor window remains stationary and is large enough to encompass the at least one discontinuity.

4. The method of claim 1, wherein the composite structure comprises a composite hat section and a laminate skin.

5. The method of claim 1, wherein the laser line is projected onto the composite structure at an angle between 20 and 40 degrees from a line pointing normal to the composite structure.

6. The method of claim 5, wherein the laser line is projected onto the composite structure at a 30 degree angle from a line pointing normal to the composite structure.

7. The method of claim 1, wherein steps (a) through (c) are repeated two times.

8. The method of claim 1, wherein steps (a) through (c) are repeated three times.

9. A Z-form position detector, comprising:
a light-emitter capable of projecting a laser line onto a Z-form that is positioned adjacent to a composite structure, the laser line having at least one discontinuity that corresponds with positional information of the Z-form;
a sensor positioned adjacent to the laser line capable of detecting the at least one discontinuity, and correlating the detection of the at least one discontinuity to the approximate position of the Z-form.

10. The Z-form position detector of claim 9, wherein the sensor scans for the at least one discontinuity over a select sensor window area on the composite structure.

11. The Z-form position detector of claim 10, wherein the sensor window remains stationary and is large enough to encompass the at least one discontinuity.

12. The Z-form position detector of claim 9, wherein the light-emitter is a laser.

13. The Z-form position detector of claim 9 wherein the correlation between the detection and the position is accurate to within +/−0.05 inches.

14. The Z-form position detector of claim 13 wherein the accuracy is within +/−0.025 inches.

15. The Z-form position detector of claim 9, wherein the composite structure includes at least one composite hat structure and a laminate skin.

16. The Z-form position detector of claim 9, wherein the light-emitter projects the laser line at an angle between 20 and 40 degrees from normal to the composite structure.

17. The Z-form position detector of claim 16, wherein the light-emitter projects the laser line at approximately 30 degrees from normal to the composite structure.

18. The Z-form position detector of claim 9 wherein the laser line is projected perpendicular to an edge of the Z-form to be located.

19. The method of claim 1 wherein the laser line is projected perpendicular to an edge of the Z-form to form a discontinuity corresponding to the Z-form edge, and the sensor translates the detection of the discontinuity into positional information pertaining to the position of the Z-form edge.

* * * * *